United States Patent [19]
Yamada

[11] Patent Number: 6,121,917
[45] Date of Patent: Sep. 19, 2000

[54] FM-CW RADAR

[75] Inventor: Yukinori Yamada, Susono, Japan

[73] Assignee: Toyota Jidosha Kabushiki Kaisha, Japan

[21] Appl. No.: 09/179,749

[22] Filed: Oct. 28, 1998

[30] Foreign Application Priority Data

Oct. 31, 1997 [JP] Japan ................................ 9-300545

[51] Int. Cl.⁷ .................................................. G01S 13/32
[52] U.S. Cl. ...................... 342/128; 342/104; 342/105; 342/107; 342/109; 342/115; 342/194; 342/195; 342/196
[58] Field of Search ................................ 342/104, 105, 342/107, 108–115, 128–133, 175, 189, 192–197, 200, 201, 18, 70

[56] References Cited

U.S. PATENT DOCUMENTS

| | | | |
|---|---|---|---|
| 5,361,072 | 11/1994 | Barrick et al. | 342/133 |
| 5,625,362 | 4/1997 | Richardson | 342/70 |
| 5,652,589 | 7/1997 | Ono et al. | 342/70 |
| 5,731,778 | 3/1998 | Nakatani et al. | 342/70 |
| 5,751,240 | 5/1998 | Fujita et al. | 342/70 |
| 5,892,477 | 4/1999 | Wehling | 342/18 |

FOREIGN PATENT DOCUMENTS

| | | |
|---|---|---|
| 58-72078 | 4/1983 | Japan . |
| 2-162283 | 6/1990 | Japan . |
| 8-327729 | 12/1996 | Japan . |

*Primary Examiner*—Bernarr E. Gregory
*Attorney, Agent, or Firm*—Finnegan, Henderson, Farabow, Garrett & Dunner, L.L.P.

[57] ABSTRACT

In an FM-CW radar, a receive section has an array antenna in which a plurality of element antennas are arrayed as receive antennas, and a plurality of mixers for generating a beat signal of each channel from a receive signal for each element antenna, and a signal processing section comprises a first device for performing analog-to-digital conversion of the beat signal of each channel into a digital beat signal of each channel and storing it, a second device for performing a Fourier transform process for the digital beat signal of each channel to obtain Fourier transform data of each channel, a third device for performing a phase shift process according to beam direction angles for the Fourier transform data of each channel and thereafter synthesizing the Fourier transform data of each channel every beam direction angle to obtain Fourier transform data of each beam direction angle, and a fourth device for detecting a range to an object and a relative velocity of the object from the Fourier transform data of each beam direction angle.

11 Claims, 13 Drawing Sheets

FM-CW RADAR

BACKGROUND OF THE INVENTION

1. Field of the Invention

The present invention relates to an FM-CW radar using a transmitted signal which is a frequency-modulated (FM) continuous wave (CW).

2. Related Background Art

The FM-CW radar is suitable for detection of relatively near objects when compared with pulse radars and in recent years research and development is going on to use the FM-CW radar as a means mounted on a car to detect position and relative velocity of an advance car or the like. The FM-CW radars heretofore were, however, arranged to obtain angle information, range information and velocity information of target by mechanical scanning of a fixed beam.

The mechanical scanning has problems of slow scanning rate, incapability of assuring adequate reliability of the mechanical part, and large size of apparatus. These issues become significant particularly in the application for tracking an advance car where the radar is mounted on a car. Specifically, the slow scanning rate tends to delay detection of the target when the azimuth angle of the advance car changes because of lane change, and thus makes it difficult to check the position in real time. Since the scanning mechanism is subject to breakage due to vibration of body etc., it is unavoidable to construct the apparatus in large and heavy structure in order to enhance reliability. There was thus the desire for the FM-CW radar without the mechanical beam scanning mechanism.

On the other hand, there exist digital beamforming (DBF) as a technique to achieve beam scanning by digital signal processing, but no technique for applying this DBF to the FM-CW radar has been established yet.

SUMMARY OF THE INVENTION

The present invention is an FM-CW radar comprising a transmit section for radiating a transmit signal resulting from frequency modulation of a fundamental wave, in the form of an electromagnetic wave, a receive section for receiving as a receive signal an electromagnetic wave re-radiated when the electromagnetic wave of the transmit signal reaches an object in an angular range including a plurality of beam direction angles and for generating a beat signal by mixing said receive signal with part of said transmit signal, and a signal processing section for detecting a range to the object and a relative velocity of the object, based on a frequency of the beat signal, wherein the receive section has an array antenna in which a plurality of element antennas are arrayed, and a plurality of mixers for mixing the receive signal with part of said transmit signal for each of the element antennas to create a beat signal of each channel, and wherein said signal processing section comprises: first means for executing analog-to-digital conversion of said beat signal of each channel into a digital beat signal of each channel and storing the digital beat signal of each channel, second means for effecting a Fourier transform process on the digital beat signal of each channel to obtain Fourier transform data of each channel having beat frequency spectrum information, third means for effecting a phase shift process according to the plurality of beam direction angles on the Fourier transform data of each channel and thereafter synthesizing the Fourier transform data of each channel every beam direction angle to obtain Fourier transform data of each beam direction angle having beat frequency spectrum information of each beam direction angle, and fourth means for calculating the range to said object and the relative velocity of the object, based on the Fourier transform data of each beam direction angle.

The present invention enabled electronic beam scanning in the FM-CW radar by carrying out a phase shift process for Fourier transform data in a signal processing section.

The signal processing section desirably has means for selecting a frequency to indicate an intensity not less than a predetermined value out of the Fourier transform data of each channel. When a subsequent synthetic operation of Fourier transform data of each beam direction angle is carried out utilizing only the Fourier transform data of frequencies thus selected, process loads on the operation are considerably decreased.

The signal processing section is desirably arranged to effect amplitude distribution correction on the Fourier transform data of each channel. Since the amplitude distribution correction suppresses sidelobes and allows adjustment of beamwidth of the main beam, a desired beam can be formed according to an application circumstance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1A:
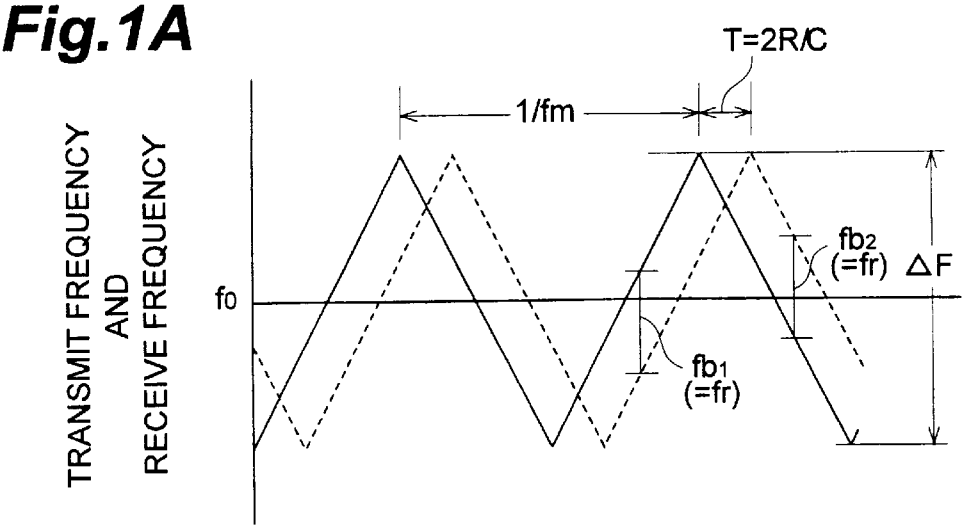
FIG. 1A and FIG. 1B are graphs for explaining the principle of detection by the FM-CW radar.
Figure 1B:
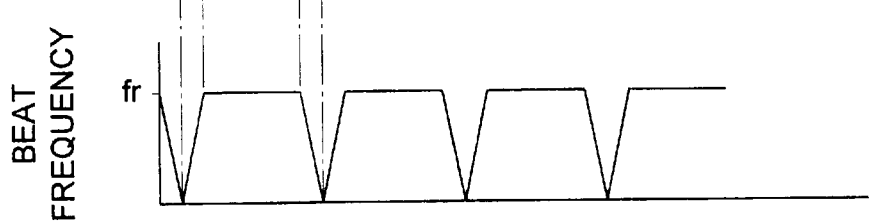
Figure 2A:
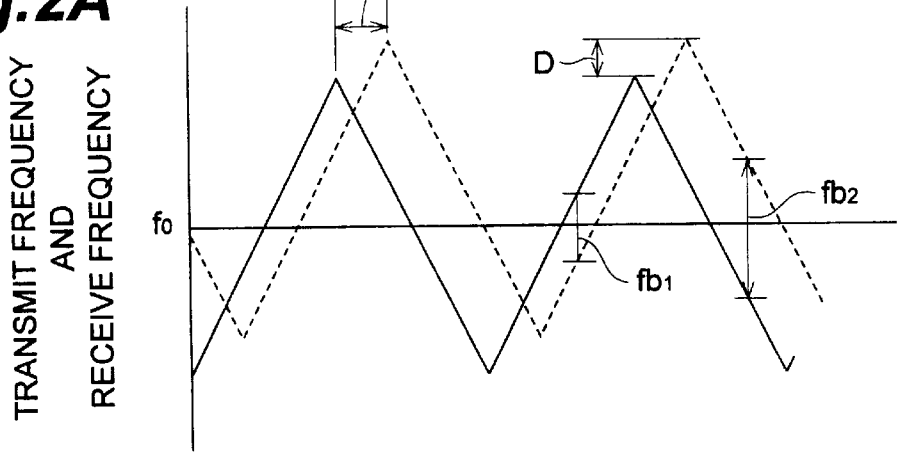
FIG. 2A and FIG. 2B are graphs for explaining the principle of detection by the FM-CW radar.

First, the principle of detection of the FM-CW radar will be described referring to the graphs of FIGS. 1A and 1B and FIGS. 2A and 2B. FIG. 1A is a graph to show change in transmit frequency and change in receive frequency of re-radiated beam from a target located at a position the distance R apart and moving at the relative velocity V of zero, wherein the ordinate indicates the frequency and the abscissa the time. The solid line indicates the frequency of transmit signal and the dashed line the frequency of receive signal. As apparent from this graph, the transmit signal is a modulated signal resulting from triangular frequency modulation of continuous wave. The center frequency of the modulated wave is f0, the frequency shift width ΔF, and the repetition frequency of the triangular wave fm. FIG. 2A is a graph to indicate change in receive signal when the relative velocity v of the target is not zero, wherein the solid line represents the frequency of transmit signal and the dashed line the frequency of receive signal. The definition of the transmit signal and coordinate axes is the same as in FIG. 1A.

It is understood from FIG. 1A and FIG. 2A that the receive signal under radiation of such transmit signal experiences a time delay T (T=2R/C: C is the speed of light) according to a range R when the relative velocity V of the target is zero and that the receive signal experiences the time delay T according to the range, and the frequency shift D commensurate with the relative velocity when the relative velocity V of the target is not zero. The example shown in FIG. 2A indicates the case where the frequency of the receive signal is shifted up and thus the target is approaching.

Figure 2B:
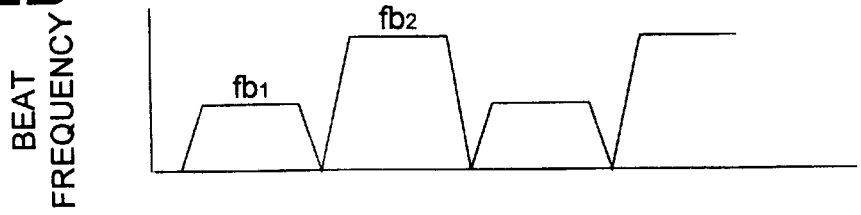

When this receive signal is mixed with part of the transmit signal, a beat signal will be obtained. FIG. 1B and FIG. 2B are graphs to show the beat frequency when the relative velocity V of the target is zero and when the relative velocity V is not zero, respectively, wherein the time axis (abscissa) is timed with that of FIG. 1A or FIG. 2A, respectively.

Now, let fr be the beat frequency at the relative velocity of zero, fd be the Doppler frequency based on the relative velocity, fb1 be the beat frequency in frequency-increasing intervals (up intervals), and fb2 be the beat frequency in frequency-decreasing intervals (down intervals). Then the following equations hold.

$$fb1 = fr - fd \quad (1)$$

$$fb2 = fr + fd \quad (2)$$

Hence, fr and fd can be calculated from the following Equations (3) and (4) by separately measuring the beat frequencies fb1 and fb2 in the up interval and in the down interval, respectively, of the modulation cycles.

$$fr = (fb1 + fb2)/2 \quad (3)$$

$$fd = (fb2 - fb1)/2 \quad (4)$$

Once fr and fd are obtained, the range R and the relative velocity V of the target can be calculated from the following Equations (5) and (6).

$$R = (C/(4 \cdot \Delta F \cdot fm)) \cdot fr \quad (5)$$

$$V = (C/(2 \cdot f0)) \cdot fd \quad (6)$$

In the above equations, C indicates the speed of light.

The range R and relative velocity V of the target can be obtained for an arbitrary beam direction as described above and, therefore, the direction, range, and relative velocity of the target can be determined by successively calculating the range R and relative velocity V with scanning of beam. This is the principle of detection of the FM-CW radar.

Next, the fundamental concept of the digital beamforming (DBF) technique utilized in the present invention will be described. The DBF is a technique for taking receive signals of an array antenna composed of a plurality of element antennas through analog-to-digital conversion into a digital signal processing section and for actualizing beam scanning and adjustment of sidelobe characteristics etc. in the digital signal processing section. The principle of the beam scanning by DBF is easier to understand when compared with a phased array antenna radar, and, therefore, the phased array antenna radar will be described first.

Figure 3:
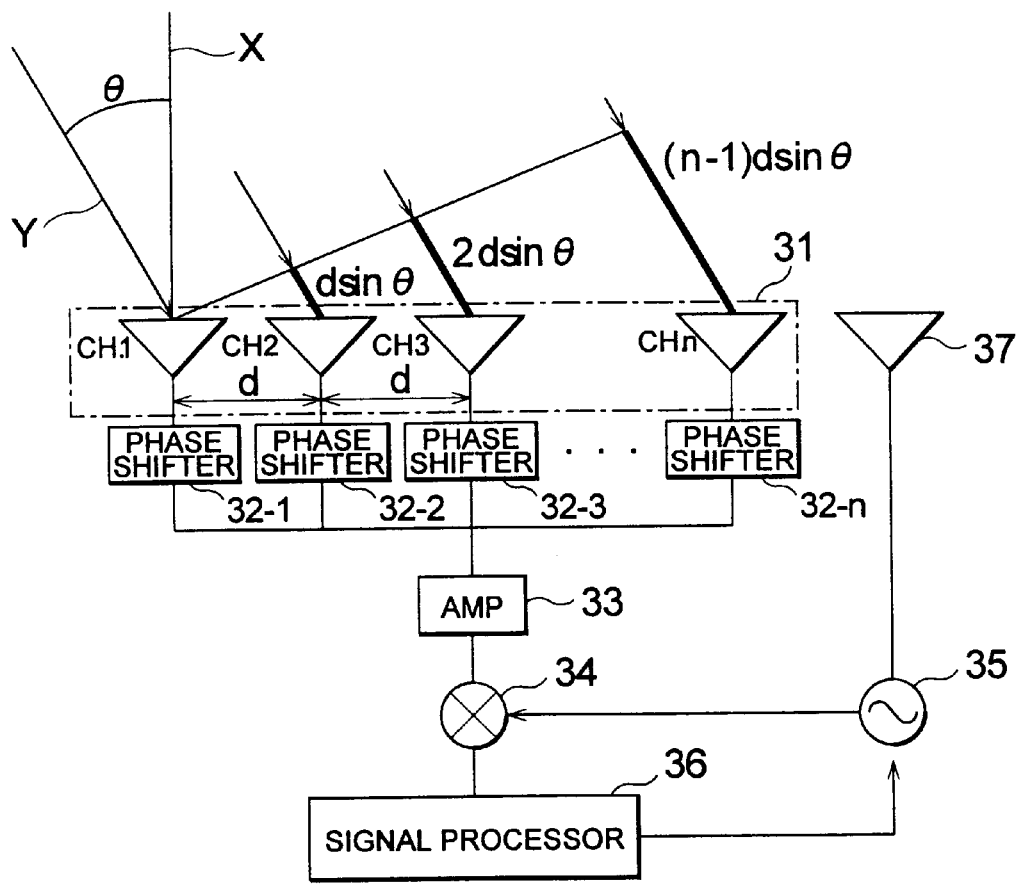
FIG. 3 is a diagram for explaining the principle of a phased array antenna.

FIG. 3 is a diagram to show the fundamental structure of the phased array antenna radar. When an array antenna 31 consisting of n element antennas arranged at the spacing d receives the radio wave coming from the direction Y which makes the angle θ to the center direction X of the radar, each propagation path length to the element antenna (CH2), . . . , or the element antenna (CHn) is dsinθ, . . . , or (n−1)dsinθ, respectively, larger than that of the radio wave to the element antenna (CH1), as shown in FIG. 3. Accordingly, the phase of the radio wave reaching the element antenna (CH2), . . . , or the element antenna (CHn) lags the phase of the radio wave reaching the element antenna (CH1) by that degree.

This phase delay is (2 πdsinθ)/λ, . . . , or (2(n−1)πdsinθ)/λ for each of the element antennas. Here, λ is the wavelength of the radio wave. This delay is restored by a phase shifter 32-1 to 32-n provided at the back end of each element antenna so as to put the phase forward, whereby the radio wave from the Y direction is received in the same phase by the all element antennas. This means that the directivity is set in the θ direction. The signal processing after synthesis of the receive signals passing through the respective phase shifters is the same as in the case of the mechanical scanning; the signal is amplified by low-noise amplifier 33, then the signal is downconverted by being mixed with the transmit signal outputted from oscillator 35, in mixer 34, and the signal is sent to signal processing circuit 36. Numeral 37 denotes a transmit antenna.

With this phased array antenna radar, the directivity can be changed to an arbitrary direction in a fixed state of the array antenna composed of the element antennas, by properly controlling the phase shift amounts of the respective phase shifters.

Figure 4:
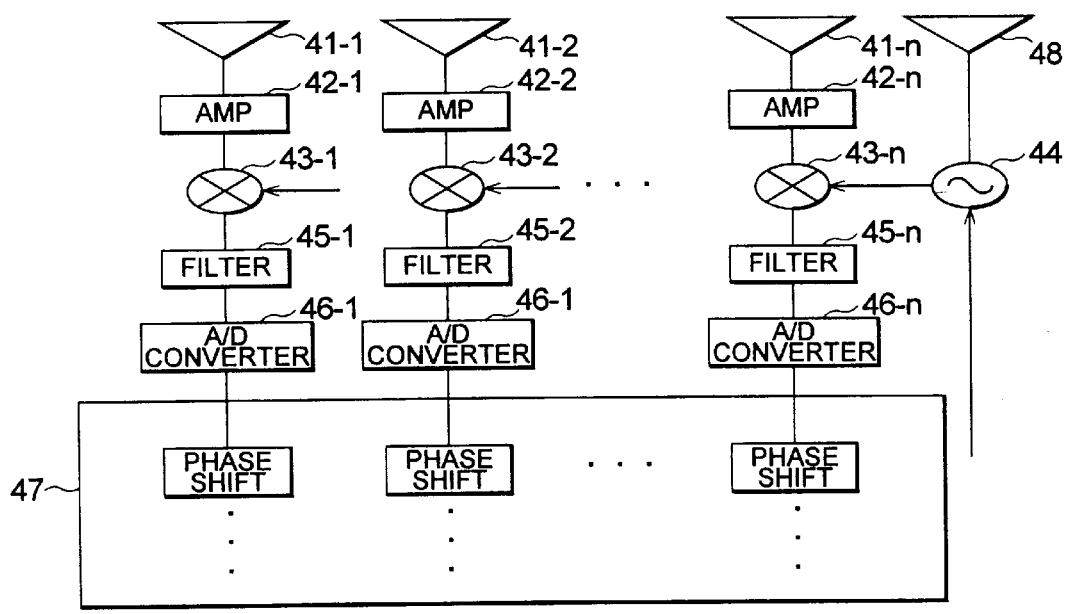
FIG. 4 is a diagram for explaining the principle of a digital beamforming antenna.

The DBF radar employs digital signal processing to achieve the function of the phase shifters of the phased array antenna radar. FIG. 4 illustrates the fundamental structure of the DBF radar. A low-noise amplifier 42-1 to 42-n is provided for each element antenna 41-1 to 41-n and the signal from each amplifier is downconverted in an associated mixer 43-1 to 43-n. The signal after the downconversion is filtered in filter 45-1 to 45-n, thereafter the analog signal is converted to a digital signal by A/D converter 46-1 to 46-n, and the digital signal is sent to digital signal processing (DSP) circuit 47. Numeral 48 denotes the transmit antenna.

Since the DSP circuit 47 can freely change the phase and amplitude, the directivity of the antenna can be determined in an arbitrary direction and in an arbitrary shape by subjecting the digital receive signals of the respective channels to the phase and amplitude conversion according to a certain rule and synthesizing the signals of the all channels. This is called digital beamforming (DBF).

A principal feature of the DBF is that once the signals of the all element antennas (all receive channels) are taken in as digital signals, a beam can be synthesized in an arbitrary direction, based thereon and, therefore, a plurality of beams can be created from one signal capture.

Since the scanning rate of beam is dependent on the processing time of the DSP circuit, the subject is how shorter the processing time is made and it becomes necessary to employ processing pursuant to the radar system.

Figure 5:
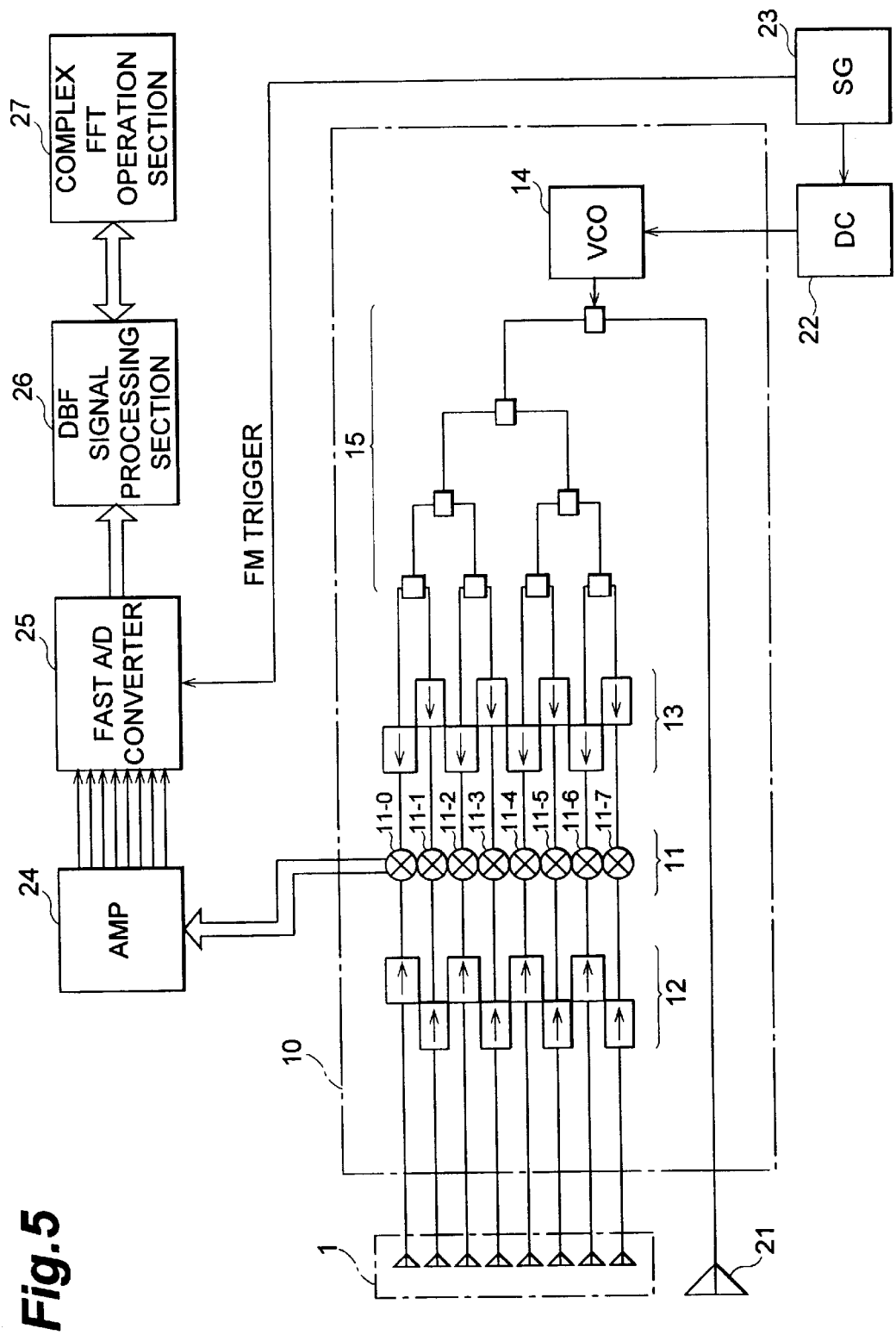
FIG. 5 is a diagram to show the structure of an FM-CW radar as an embodiment of the present invention.

The FM-CW radar of the present invention is an application of the principle of the DBF described above to the FM-CW radar. FIG. 5 illustrates an embodiment of the present invention. This FM-CW radar is a DBF radar having one channel for transmission and eight channels for reception. Accordingly, the array antenna 1 for reception is provided with eight element antennas corresponding to the respective channels. Each element antenna is connected to a corresponding mixer 11-0 to 11-7 through an individual isolator composing an isolator group 12.

The mixer 11-0 to 11-7 mixes the receive signal reaching each element antenna with part of the transmit signal to obtain a beat signal. The transmit signal component given as a local signal to the mixer 11-0 to 11-7 is supplied from a voltage-controlled oscillator (VCO) 14 through branch circuit 15 and isolator group 13.

The oscillator 14 is a varactor control type Gunn oscillator having the center frequency of f0 (for example, 60 GHz), which outputs the modulated wave in the range of f0±(1/2) ΔF from control voltage outputted from dc power supply 22 for modulation. The frequency modulation (FM) herein is the triangular wave modulation as described in FIG. 1A. This frequency-modulated wave is supplied through the branch circuit 15 to the transmit antenna 21 to be radiated as the transmit signal and, as described above, is branched into the eight channels as local signals to be mixed with each receive signal of the eight channels in each mixer 11-0 to 11-7 to generate a beat signal of each channel. The dc power supply 22 regularly changes the output voltage under control of a signal source for modulation 23.

At the back end of high-frequency circuit 10 composed of the mixer group 11, isolator groups 12, 13, oscillator 14, and branch circuit 15, there are provided low-noise amplifier 24, fast A/D converter 25, DBF signal processing section 26, and complex FFT operation section 27.

The low-noise amplifier (amp) 24 amplifies the beat signals of the eight channels outputted from the mixers 11-0 to 11-7 in parallel. The amp 24 incorporates a low-pass filter having the cut-off frequency 77 kHz for antialiasing.

The fast A/D converter 25 is a circuit for carrying out analog-to-digital conversion of the beat signals of the eight channels in parallel and simultaneously, in which sampling is performed at 200 kHz. The sampling at this sampling frequency is carried out to sample 128 points in each of a frequency-increasing interval and a frequency-decreasing interval of the modulated wave by the triangular modulation.

Figure 6:
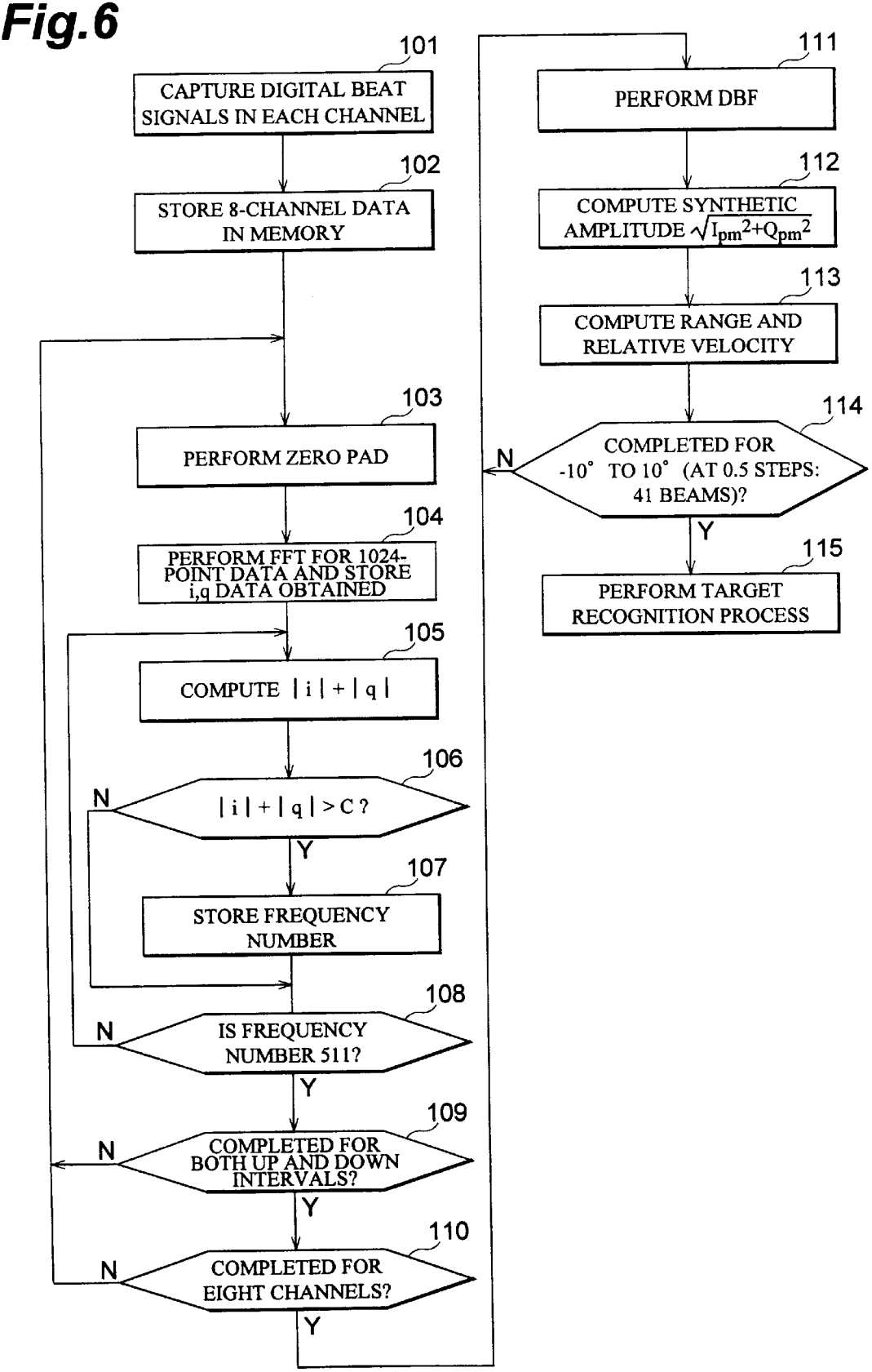
FIG. 6 is a flowchart to show the operation of the FM-CW radar.

The DBF signal processing section 26 gains the digital beat signals of the respective channels from the fast A/D converter 25 and performs the DBF process and the range and velocity computation according to the flowchart shown in FIG. 6, so as to carry out a recognition process of target (object).

The complex FFT operation section 27 is an arithmetic unit for executing the complex FFT operation among a sequence of processes in the DBF signal processing section 26 therefor, which receives the digital beat signals of the respective channels from the DBF signal processing section 26, carries out the complex FFT operation thereon, and returns the result to the DBF signal processing section 26.

Next, the signal processing by synergic operation of the DBF signal processing section 26 and complex FFT operation section 27 will be described referring to the flowchart of FIG. 6.

At step 101 the digital beat signals of the respective channels are taken in. The digital beat signals of the respective channels are obtained by the sampling at 128 points in each of a frequency-increasing interval (up interval) and a frequency-decreasing interval (down interval) of the modulated wave by the triangular modulation for each channel. Therefore, the total data taken in is data at 128 (points)×2 (intervals)×8 (channels)=2048 points. This data all is stored at step 102 to be held before the next FFT process and DBF process.

Then steps 103 to 110 are repetitively carried out to gain beat frequency spectrum information for each of the up interval and down interval of each channel, which is necessary for the DBF process at step 111.

Figure 7A:
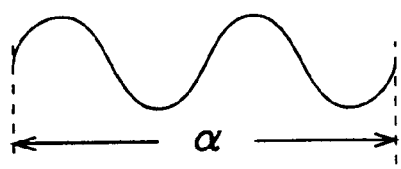
FIG. 7A and FIG. 7B are graphs for explaining a zero pad process for FFT operation.
Figure 7B:
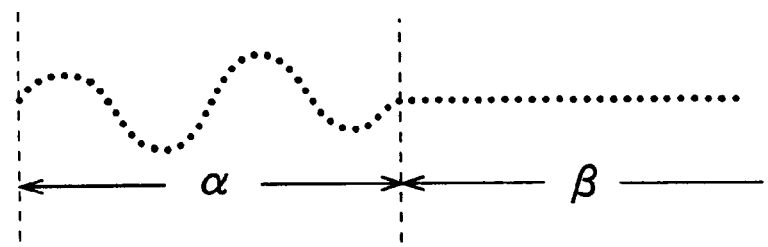

First, step 103 is to effect an extrapolation process called zero pad to attach a zero-data string to the data at 128 points of the up interval of the first channel. This is for apparently increasing the number of input data for the fast Fourier transform process (FFT) to enhance the read resolution of FFT frequency. This enhances the measurement resolution of frequency peak. FIG. 7A and FIG. 7B illustrate this zero-pad process (0-point extrapolation process), in which sampling is carried out at 128 points, as shown in the interval a of FIG. 7B, for example for the signal of the waveform in the up interval α as shown in FIG. 7A, the analog data is converted to digital data, and the zero-data string, for example 896 points, is further attached to the digital data as shown in the interval β in FIG. 7B, thus obtaining the data of 1024 points in total. This apparent increase in the number of data permits the peak frequency, i.e. the frequency to indicate a peak of the frequency spectrum, to be detected with accuracy.

Figure 8A:
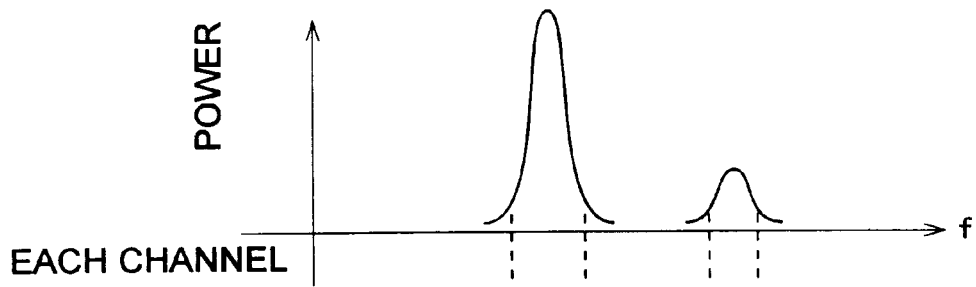
FIG. 8A, FIG. 8B, and FIG. 8C are graphs for explaining phase rotation in the zero pad process.
Figure 8B:
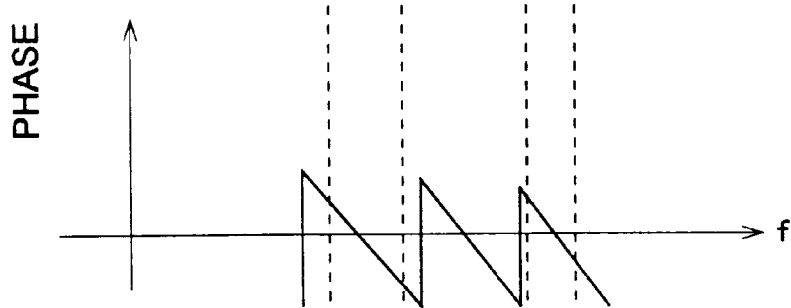
Figure 8C:
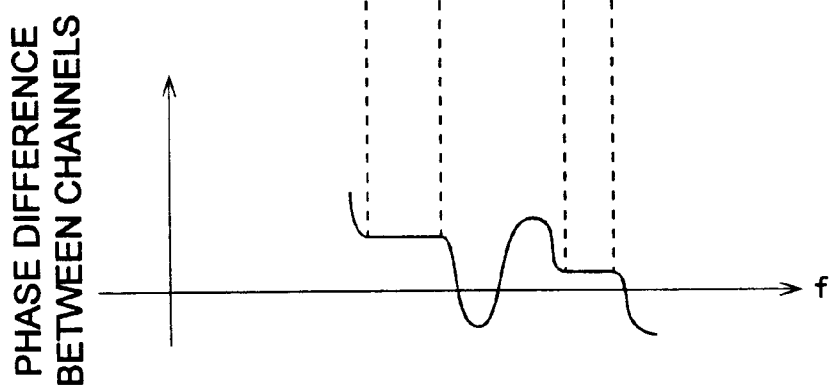

Execution of this zero-pad process, however, poses a problem that the phase continuously turns near the peak of the frequency spectrum. FIGS. 8A to 8C are graphs to show the result of execution of FFT on the data subjected to the zero-pad process. For example, supposing the frequency characteristics as shown in FIG. 8A are obtained, the phase turns near frequency peaks as shown in FIG. 8B. In the present invention, the phase shift process is carried out on a channel-by-channel basis using the data after execution of the FFT process, in the DBF process described hereinafter, and thus the phase turn due to the zero-pad is not preferred. According to studies and experiments by the inventors, it is, however, found that when the phase difference is taken between channels, it becomes constant near each frequency peak, as shown in FIG. 8C. Accordingly, the DBF can be conducted in accordance with the principle thereof if the phase shift process is carried out based on the relative phase difference between channels.

After completion of the zero-pad process at step 103, step 104 is provided for carrying out the FFT process of the 1024 points in the up interval of the first channel. This gains an in-phase component i and a quadrature component q for each of 512 frequency points, and they are stored as Fourier transform data of each channel having the beat frequency spectrum information of each channel.

Next, step 105 is to sum absolute values of i and q of the smallest frequency (the frequency number 0) out of the 512 sets of i,q data obtained at step 104. More specifically, computation of |i|+|q| is carried out. At step 106 the value of |i|+|q| is then compared with a set value C preliminarily determined. If the sum exceeds the set value C, then the frequency number of 0 is stored at step 107. If the value of |i|+|q| is not more than the set value C then the program skips step 107 and goes to step 108.

Step 108 is to determine whether the frequency number of the processed object in the steps 105 to 107 is the last number of 511. Presently, the frequency number is 0 and thus the program returns to step 105. For the next frequency, i.e., the frequency number 1, the program continues carrying out the computation of |i|+|q|, the comparing process with the set value C at step 106, and the storage of the frequency number at step 107 according to the result of the comparison.

After this operation of steps 105 to 108 is completed for the all 512 frequency points, all frequency numbers of frequencies to indicate relatively high power (amplitude) are stored for the up interval of the first channel. Namely, the computation at step 105 and the comparison process at step 106 are for easily choosing frequencies to indicate relatively large amplitudes, and loads on the DBF operation process are reduced by executing the DBF using only the data of the frequency numbers selected herein, at step 111 described hereinafter.

Step 109 is to determine whether the FFT operation and the pickup operation (steps 103 to 108) of the frequency numbers used in the DBF are completed for the both up interval and down interval of one channel. At present, the operation is just completed only for the up interval of the first channel. Therefore, the program returns to step 103 to carry out the zero-pad process for the down interval of the first channel and then executes the FFT operation and frequency number selection in steps 104 to 108 to follow.

After completion of the FFT operation and frequency number selection for the up interval and down interval of the first channel, the program returns from step 110 to step 103 to repetitively carry out the same operation so as to carry out the FFT operation and frequency number selection for the up intervals and down intervals of the second channel to the eighth channel.

The operation up to this point is the pre-operation for the DBF and, subsequently, the DBF is executed at step 111.

In the present embodiment sweep angles θ of the beam range from −10° to +10°, and formation of forty one beams is performed in the angular resolution of 0.5° pitch. Namely, beamforming is conducted at step 111 for beam direction angle out of the forty one angles in the range of −10° to +10°.

Figure 9:
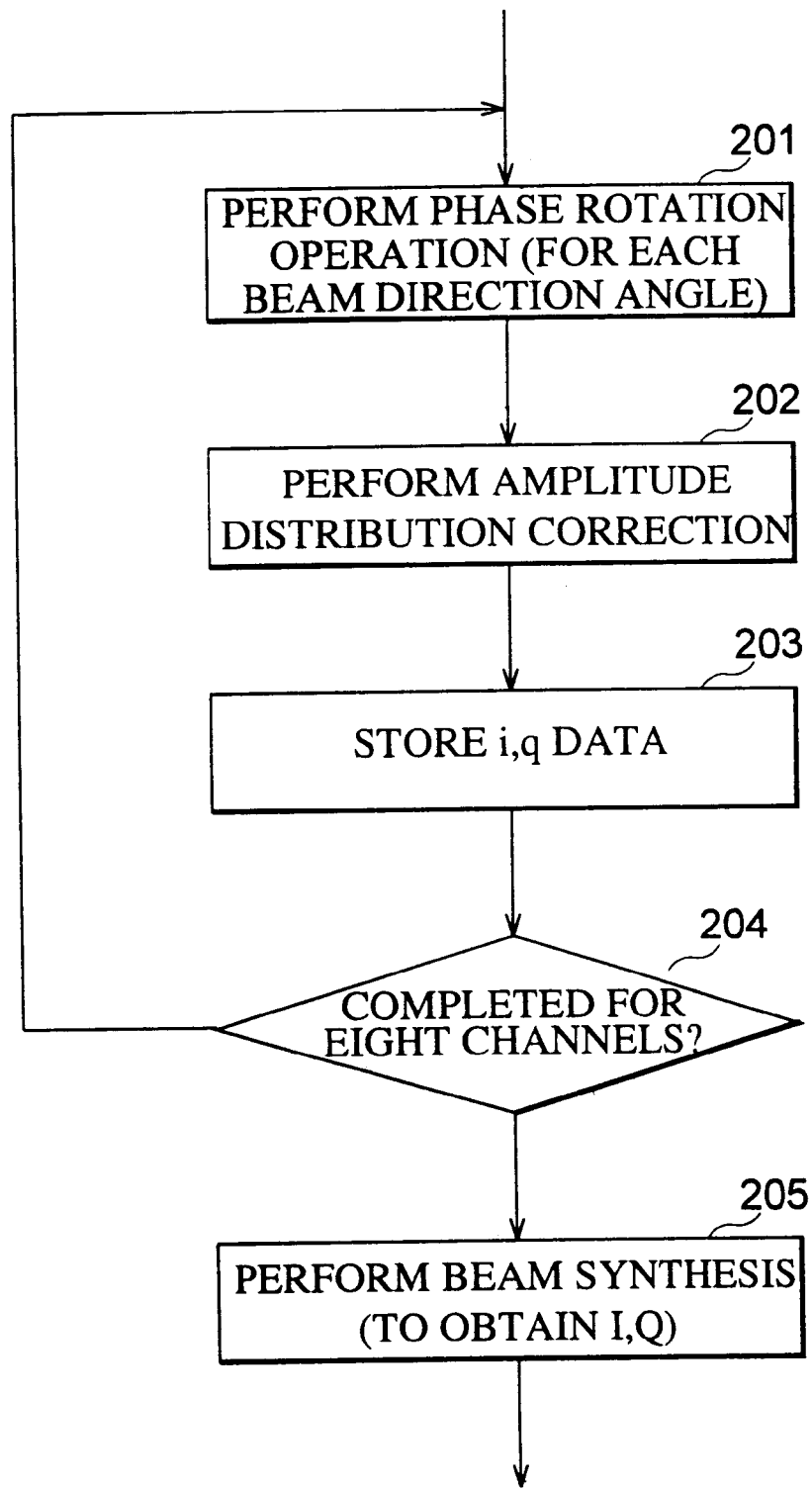
FIG. 9 is a flowchart to show the details of the DBF process.

FIG. 9 is a flowchart to show an internal process in step 111. First, a phase rotation operation (phase shift operation) is carried out every channel and every up interval or down interval at step 201. At this step, i, q data is obtained for one beam direction angle θ out of the forty one angles by multiplying the i, q data (vectors) of the all frequency numbers previously selected at step 107 in the m-th modulation interval (m=0 (up interval) or 1 (down interval)) of the l-th (l=0 to 7) channel by a phase rotation matrix, as indicated by Eq. (7) below.

$$\begin{pmatrix} i_{plm}^{(1)} \\ q_{plm}^{(1)} \end{pmatrix} = \begin{pmatrix} \cos((2l-7)\phi/2), & -\sin((2l-7)\phi/2) \\ \sin((2l-7)\phi/2), & \cos((2l-7)\phi/2) \end{pmatrix} \times \begin{pmatrix} i_{plm} \\ q_{plm} \end{pmatrix} \quad (7)$$

φ: 2 πdsinθ/λ
p: frequency number selected
l: channel number (0 to 7)
m: modulation interval number (0 or 1)
In Eq. (7) the superscript (1) attached to i and q indicates i, q data at the stage after execution of the phase rotation operation. In the definition of φ, d represents the distance between element antennas and λ the wavelength at the center frequency of the transmit signal.

After completion of the computation of Eq. (7) above as to the i, q data in the up interval and down interval of one channel, an amplitude distribution correction process is then carried out at step 202. When amplitudes of the respective element antennas are distributed in a uniformly equal pattern in the array antenna, a synthesized radiation pattern of the antenna has high sidelobes on either side of the main beam at the center, as shown in a uniform synthetic beam of FIG. 10B. If there exists an object in the angular direction in which the sidelobe is established, the antenna will detect as if the object exists in the angular direction of the main beam. It is thus desired to make the sidelobes to the least.

Figure 10A:
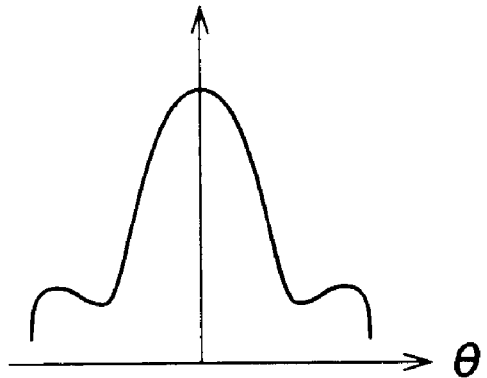
FIG. 10A and FIG. 10B are graphs to show states of synthesized beams with application of respective amplitude distribution processes.
Figure 10B:
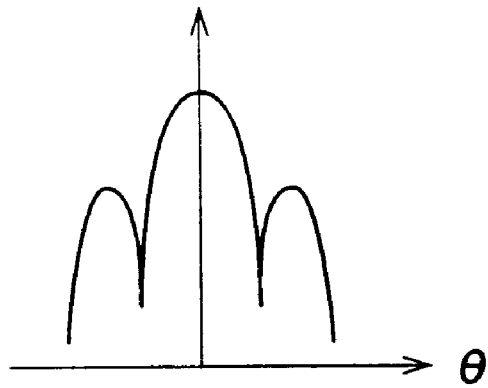
Figure 11:
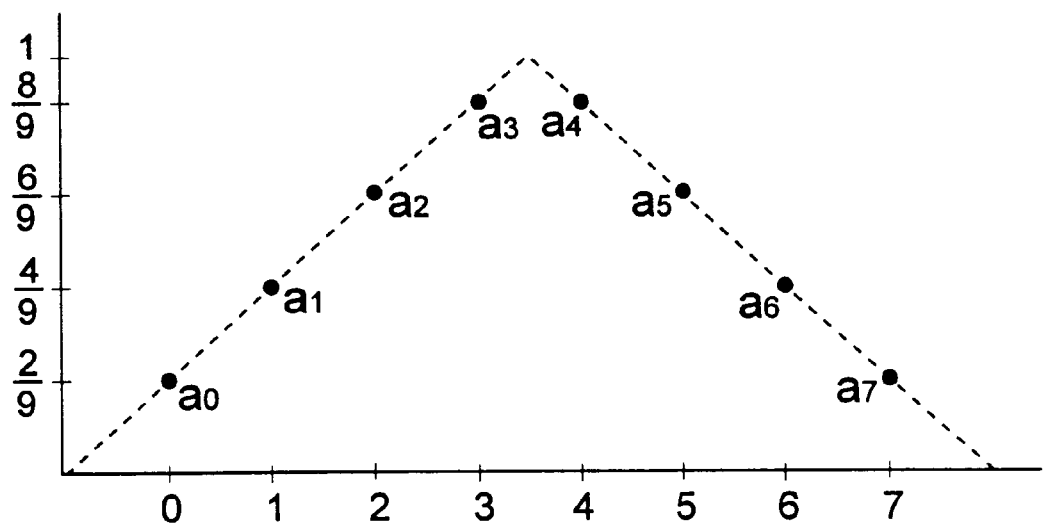
FIG. 11 is a graph to show an example of coefficients for a taper amplitude distribution process.

In order to decrease the sidelobes, the present embodiment employs a taper amplitude distribution in which the amplitude is large for the element antennas in the central part and decreases toward the both ends, as shown in FIG. 11. In the same drawing, the abscissa represents a number of each element antenna and the ordinate a magnitude (ratio) of amplitude distributed constant for each element antenna. When the taper amplitude distribution described above is employed, the synthetic beam comes to have small sidelobes as shown in FIG. 10A. This taper amplitude distribution is gained at step 202 by the data computation process based on Eq. (8) below.

$$\begin{pmatrix} i_{plm}^{(2)} \\ q_{plm}^{(2)} \end{pmatrix} = a_l \begin{pmatrix} i_{plm}^{(1)} \\ q_{plm}^{(1)} \end{pmatrix} \quad (8)$$

Here, the superscript (2) on i and q indicates the i, q data at the stage after execution of the amplitude distribution correction.

After this amplitude distribution correction is carried out for the both up interval and down interval of one channel, the results of the i, q data are stored at step 203.

After the channel-by-channel phase rotation process (channel-by-channel phase shift process) and amplitude distribution correction process described above are completed for the all channels (the eight channels), the program proceeds from step 204 to step 205 to carry out beam synthesis for each frequency number in each modulation interval according to next Eq. (9).

$$\left. \begin{array}{l} I_{pm} = \sum_{l=0}^{7} i_{plm}^{(2)} \\ Q_{pm} = \sum_{l=0}^{7} q_{plm}^{(2)} \end{array} \right\} \quad (9)$$

The above completes the DBF process at step 111 and then a synthetic amplitude is computed according to next Eq. (10) for each frequency number in each modulation interval at step 112.

$$\sqrt{I_{pm}^2 + Q_{pm}^2} \quad (10)$$

These synthetic amplitudes are the Fourier transform data of each beam direction angle having the frequency spectrum information of each beam direction angle.

Next, step 113 is to compute the range and relative velocity of the target. The first step is pairing between a peak frequency of the frequency spectrum in the up interval and a peak frequency of the frequency spectrum in the down interval. There are a variety of conventional pairing methods; for example, a method for simply arranging peaks in the order of frequencies from the smallest for each interval and coupling peaks with a same order with each other.

From the frequency of the up interval (the beat frequency fb1) and the frequency of the down interval (the beat frequency fb2) thus paired, the beat frequency fr at the relative velocity of zero, and the Doppler frequency fd are calculated based on Eq. (3) and Eq. (4) described above, and fr and fd are put into Eq. (5) and Eq. (6) to obtain the range R to the target and the relative velocity V of the target. This gains the range and relative velocity of the target for one beam direction.

Then the program moves to step 114 to determine whether the range and relative velocity of the target were obtained for the all directions of the forty one angles in the range of −10° to +10°. In the negative case the program returns to step 111 to execute the DBF process for another unprocessed direction. In this way the program carries out step 111 to step 114 for the all directions (the forty one directions) in the preset range to obtain all ranges and relative velocities at the respective beam direction angles. At the last stage step 115 is to carry out a recognition process of the target from these range information and relative velocity information of the respective angles. The target recognition process may be carried out by employing either one of conventional techniques depending upon the application.

Figure 12:
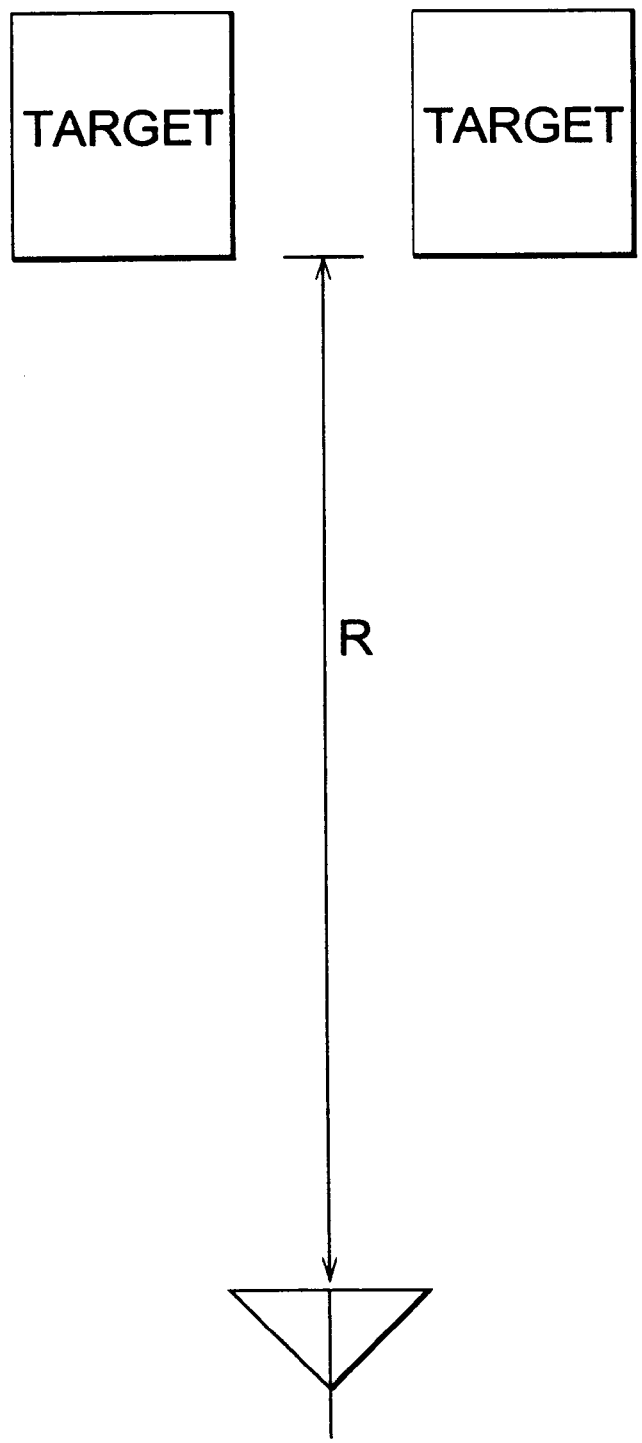
FIG. 12 is a diagram to show positions of two targets with respect to the radar.

Incidentally, the present embodiment is arranged to carry out the taper amplitude distribution correction process for controlling the sidelobes to the low level, in the amplitude distribution correction process of step 202. It is, however, found that the taper amplitude distribution correction results in increasing the beamwidth of the main beam, as compared with the uniform amplitude distribution with uniform amplitudes. Supposing there exist two targets and the two targets are close to each other as shown in FIG. 12, they could be misjudged as a single target with use of a wide main beam.

Figure 13A:
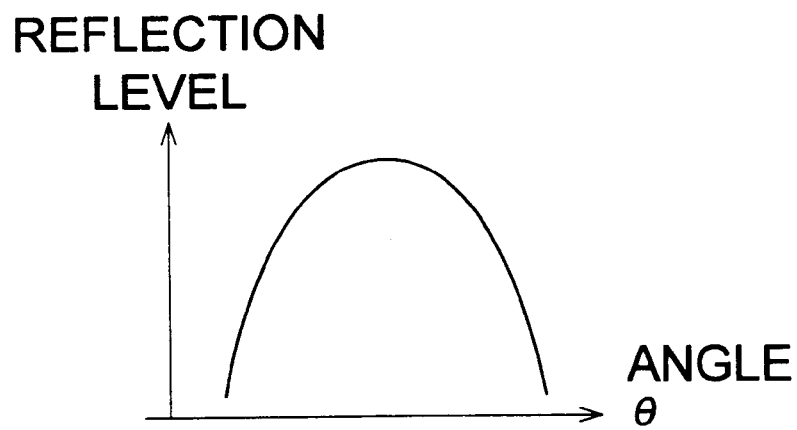
FIG. 13A and FIG. 13B are graphs to indicate reflection levels according to the synthesized beams resulting from the respective amplitude distribution processes.
Figure 14:
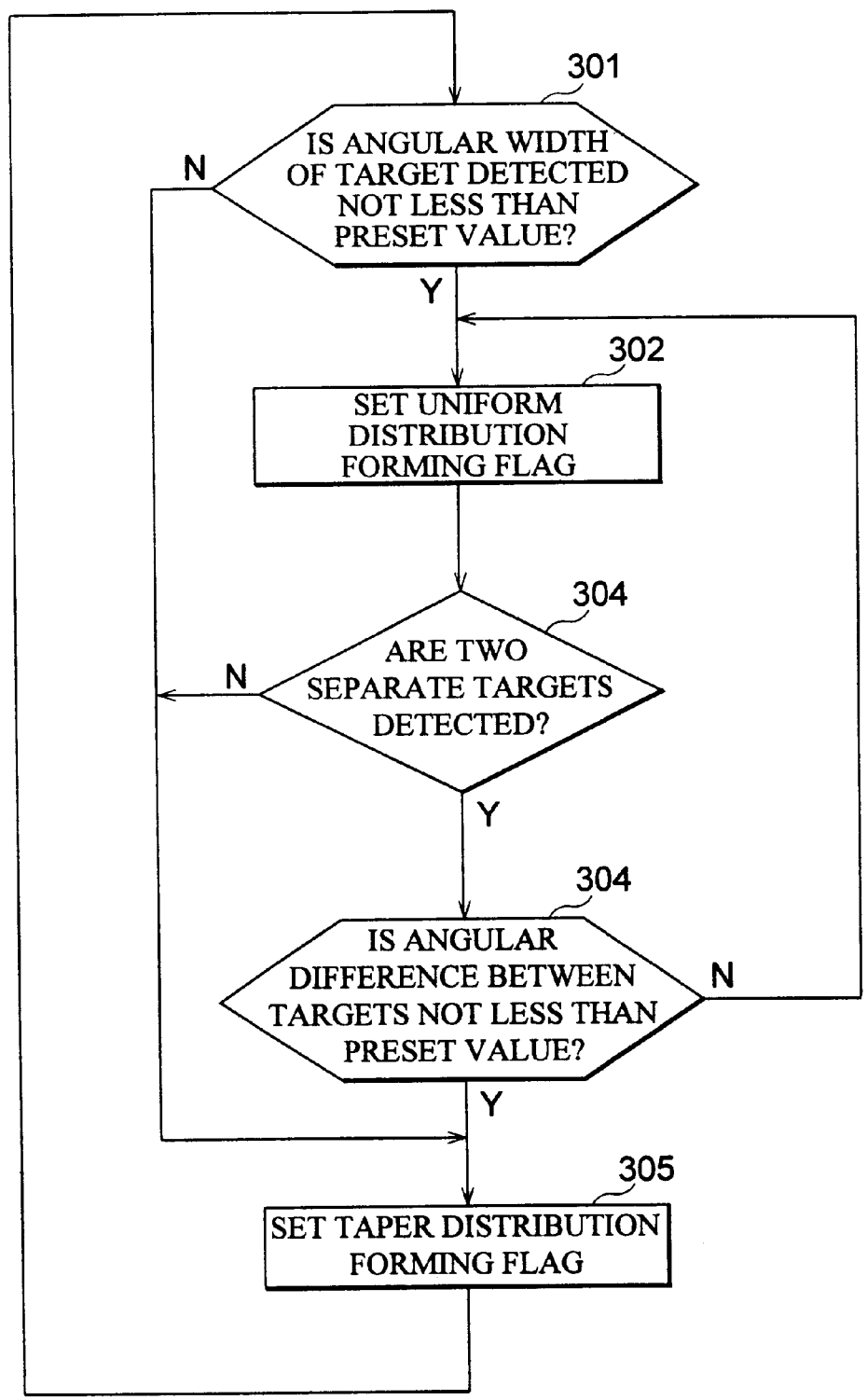
FIG. 14 is a flowchart to indicate a switching process between the amplitude distribution processes.

If the two targets are misjudged as one on the other hand, the angular width of reflection level from the targets will be expanded as illustrated in FIG. 13A. When the angular width of reflection level is determined to be not less than a certain value in the target recognition process of step 115, the amplitude distribution is thus switched to the uniform amplitude distribution according to the flow of an amplitude distribution switch process shown in FIG. 14.

Figure 13B:
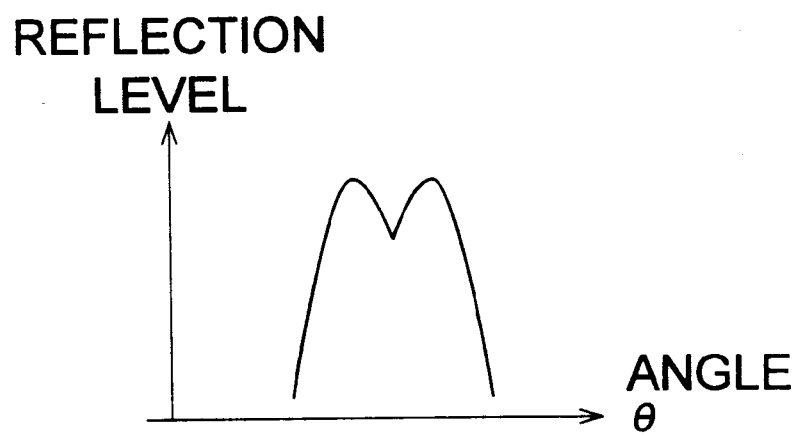

When at step 301 the angular width of a target (object) detected is not less than the certain value, step 302 is carried out to set a flag to designate the uniform amplitude distribution with omission of the taper amplitude distribution correction process of step 202. With presence of this flag, step 202 of the subroutine flow is not carried out in the step 111 of the general flow. This makes the main beam thinner, and in the case of the two targets existing, the reflection level spectrum will have two peaks as illustrated in FIG. 13B, thus permitting them to be recognized as separate objects.

If the target is so recognized as not to be separate, the target can be considered to be a big target having a wide width (angle of elevation) and the program thus moves from step 303 to step 305 to replace the uniform amplitude distribution forming flag with a taper amplitude distribution forming flag. When at step 303 the target is so recognized as to be separate and an angular difference between the two targets is not less than a certain value, the uniform amplitude distribution forming flag is maintained; if the angular difference is smaller than the certain value, the flag is replaced by the taper amplitude distribution forming flag.

As detailed above, the FM-CW radar of the present invention is adapted to carry out the phase shift process for the Fourier transform data in the signal processing section, thereby enabling electronic beam scanning in the FM-CW radar. The scanning rate and reliability against vibration are higher than those in the mechanical scanning. Since the driving means for scanning is unnecessary, the size of apparatus can be decreased.

If the radar is further provided with the means for selecting frequencies to indicate an intensity not less than the predetermined value, out of the Fourier transform data of each channel, the subsequent beat signal frequency computation of each beam direction angle can be carried out using only the Fourier transform data of the selected frequencies, whereby the process loads on the computation are reduced drastically. In other words, the computation process time can be shortened and the target can be detected in shorter time. This is extremely effective when the moving speed of the target is large.

If the channel-by-channel amplitude distribution correction is further effected on the Fourier transform data of each channel, the sidelobes can be controlled and the beamwidth of the main beam can be adjusted; therefore, a desired beam can be formed depending upon the application condition. For example, it becomes possible to carry out a process for performing a rough target search with a beam having the main beam of a relatively wide beamwidth and the sufficiently controlled sidelobes and for, once a target is detected, detecting the precise status of the target by switching the amplitude distribution to another distribution with a narrower beamwidth of the main beam.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An FM-CW radar comprising a transmit section for radiating a transmit signal resulting from frequency modulation of a carrier wave, a receive section for receiving a receive signal, which is the transmit signal reflected from an object, in an angular range including a plurality of beam direction angles and for generating a beat signal by mixing said receive signal with part of said transmit signal, and a signal processing section for detecting a range to said object and a relative velocity of said object, based on a frequency of said beat signal, wherein said receive section has an array antenna in which a plurality of element antennas are arrayed in a plurality of channels, and a plurality of mixers for mixing the receive signal with part of said transmit signal for each of said element antennas to create a beat signal of each channel of said plurality of channels, and wherein said signal processing section comprises:

a first means for executing analog-to-digital conversion of said beat signal of each channel into a digital beat signal of each channel and storing said digital beat signal of each channel;

second means for effecting a Fourier transform process on the digital beat signal of each channel to obtain Fourier transform data of each channel having beat frequency spectrum information;

third means for effecting a phase shift process according to said plurality of beam direction angles on said Fourier transform data of each channel and thereafter synthesizing the Fourier transform data of each channel for every beam direction angle to obtain Fourier transform data of each beam direction angle having beat frequency spectrum information of each beam direction angle; and fourth means for calculating the range to said object and the relative velocity of said object, based on said Fourier transform data of each beam direction angle.

2. The FM-CW radar according to claim 1, wherein said transmit signal is a signal subjected to triangular modulation in which frequency-increasing intervals and frequency-decreasing intervals appear alternately, and wherein said fourth means includes pairing a frequency to indicate a peak value of said Fourier transform data of each beam direction angle in said frequency-increasing interval with a frequency to indicate a peak value of said Fourier transform data of each beam direction angle in said frequency-decreasing interval and calculating the range to said object and the relative velocity of said object at the beam direction angle of interest from the two frequencies thus paired.

3. The FM-CW radar according to claim 2, wherein said signal processing section further comprises fifth means for selecting a frequency to indicate an intensity value not less than a predetermined value out of said Fourier transform data of each channel obtained by said second means, and wherein said third means includes effecting the phase shift process according to said plurality of beam direction angles on said Fourier transform data of each channel selected by said fifth means and thereafter synthesizing the Fourier transform data of each channel every beam direction angle to obtain the Fourier transform data of each beam direction angle.

4. The FM-CW radar according to claim 3, wherein said third means includes performing an amplitude distribution correction process on the occasion of said phase shift process on said Fourier transform data of each channel.

5. The FM-CW radar according to claim 4, wherein said amplitude distribution correction process is carried out by multiplying said Fourier transform data of each channel obtained by said second means by a preset amplitude distribution pattern.

6. The FM-CW radar according to claim 5, wherein said amplitude distribution correction process is executed on a selective basis.

7. The FM-CW radar according to claim 6, wherein said amplitude distribution pattern is a taper amplitude distribution pattern with decreasing amplitudes from a channel in a central part toward channels at the both ends.

8. The FM-CW radar according to claim 2, wherein said third means includes performing an amplitude distribution correction process on the occasion of said phase shift process on said Fourier transform data of each channel.

9. The FM-CW radar according to claim 8, wherein said amplitude distribution correction process is carried out by multiplying said Fourier transform data of each channel obtained by said second means by a preset amplitude distribution pattern.

10. The FM-CW radar according to claim 9, wherein said amplitude distribution correction process is executed on a selective basis.

11. The FM-CW radar according to claim 10, wherein said amplitude distribution pattern is a taper amplitude distribution pattern with decreasing amplitudes from a channel in a central part toward channels at the both ends.

* * * * *